(12) United States Patent
Furukubo (10) Patent No.: US 8,074,696 B2
(45) Date of Patent: Dec. 13, 2011

(54) AUTOMATIC MASK PEELING APPARATUS

(75) Inventor: Hiroshi Furukubo, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 522 days.

(21) Appl. No.: 12/400,239

(22) Filed: Mar. 9, 2009

(65) Prior Publication Data

US 2009/0229765 A1  Sep. 17, 2009

(30) Foreign Application Priority Data

Mar. 13, 2008  (JP) ................................ 2008-064383

(51) Int. Cl.
*B32B 38/10* (2006.01)

(52) U.S. Cl. ........ 156/757; 156/708; 156/714; 156/763; 156/766

(58) Field of Classification Search ............ 156/708, 156/714, 718, 757, 763, 766
See application file for complete search history.

(56) References Cited

U.S. PATENT DOCUMENTS

| | | | | |
|---|---|---|---|---|
| 4,183,751 A | * | 1/1980 | Matsumoto et al. | 430/258 |
| 5,656,127 A | * | 8/1997 | De Niel et al. | 156/764 |
| 5,676,789 A | * | 10/1997 | Hamamura | 156/714 |
| 6,153,042 A | * | 11/2000 | Tominaga | 156/709 |

FOREIGN PATENT DOCUMENTS

| | | |
|---|---|---|
| EP | 1 595 666 A1 | 11/2005 |
| JP | A-09-309664 | 12/1997 |
| JP | A 2001-300922 | 10/2001 |

OTHER PUBLICATIONS

European Search Report issued in European Patent Application No. 09250673.2 dated Apr. 15, 2011.

* cited by examiner

*Primary Examiner* — Mark A Osele
(74) *Attorney, Agent, or Firm* — Oliff & Berridge, PLLC

(57) ABSTRACT

An automatic mask peeling apparatus 10 includes: a brushing apparatus 30 for removing solidified plugging slurry attached to the mask 24; an air injection apparatus 36 for injecting, after the removal of the solidified plugging slurry, air from the opposite end face-side of the one end face to raise a folded surplus part of the mask from the one end face; a mask peeling apparatus 50 for holding the part raised by the air injection apparatus 36 to peel the mask 24; and a carrying apparatus 55 for carrying a masked plugging honeycomb structure 200 from the brushing apparatus 30 to the mask peeling apparatus 50. This apparatus can be used to peel a mask 24 which has been used for plugging only the predetermined cells of a masked plugging honeycomb structure 200; the mask 24 having an area larger than the area of the end face of the structure.

3 Claims, 7 Drawing Sheets

AUTOMATIC MASK PEELING APPARATUS

FIELD OF THE INVENTION

The present invention relates to an automatic mask peeling apparatus. In particular, the present invention relates to an automatic mask peeling apparatus that can automatically peel a mask adhered to an end face without causing a part of the mask to be left on the end face.

DESCRIPTION OF THE RELATED ART

Exhaust gas exhausted from an internal-combustion engine such as a diesel engine includes a large amount of particulate (particulate substance) that is mostly composed of carbon. Carbon is a causing factor of environmental pollution. To cope with this, an exhaust air system of a diesel engine for example generally includes a filter for collecting particulate.

Figure 8:
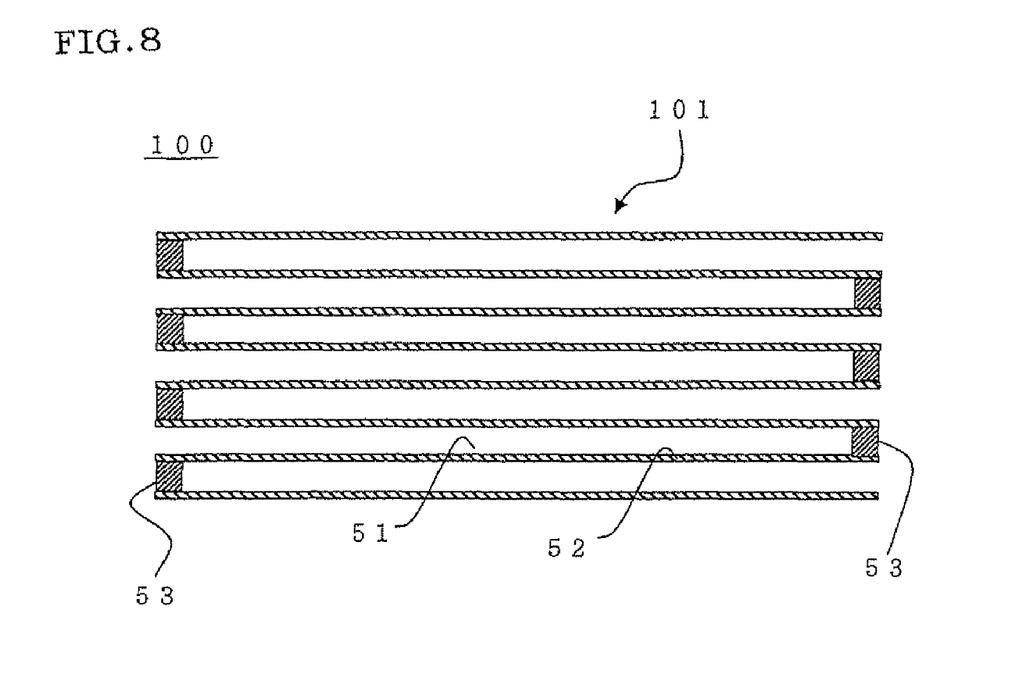
FIG. 8 is a cross-sectional view illustrating the plugging honeycomb structure in the axial direction.

The filter as described above has a structure as shown in FIG. 8 for example. Specifically, a plugging honeycomb structure 100 is used as the filter that includes: a honeycomb structure 101 having a plural number of porous partition walls 52 for dividing a plurality of cells 51; and plugging sections 53 each of which is provided so as to seal one of two opening ends of each cell 51. The plugging sections 53 are arranged to draw a complementary checkered pattern by one end faces and the other end faces of the honeycomb structure 101.

According to a known method of manufacturing the plugging honeycomb structure, a mask having an adherent layer is adhered on one end face of an unbaked honeycomb structure. Then, a plural number of holes is opened in a part of this mask covering a cell to which a plugging section should be provided by a laser processing using an image processing for example. Thereafter, an end section to which the mask is adhered is immersed in plugging slurry to fill the plugging slurry to the end section of the cell. Then, the slurry is dried and the mask adhered to the end face is peeled and baked (see Patent Document 1 for example).

[Patent Document 1] JP-A-2001-300922

In the case of the manufacture method according to Patent Document 1, the mask adhered to the end face has been manually peeled, thus requiring a time for peeling the mask. Furthermore, this manufacture method may cause a case where a part of the mask is left on the end face after the peeling process, which requires additional labor to peel the mask left on the end face.

The present invention has been made in view of the disadvantages of the prior art. It is an objective of the invention to provide an automatic mask peeling apparatus by which a plugging honeycomb structure can be manufactured so that a mask adhered to an end face can be automatically peeled and the mask can be peeled from the end face without causing a part of the mask to be left on the end face.

SUMMARY OF THE INVENTION

According to the present invention, an automatic mask peeling apparatus shown below is provided.

[1] An automatic mask peeling apparatus for peeling a mask of a masked plugging honeycomb structure; the masked plugging honeycomb structure being obtainable by adhering, on at least one end face of a quadrangular prism-like honeycomb structure having a plural number of porous partition walls for dividing a plurality of cells, a mask having a larger area than that of the one end face, opening a plural number of holes at a predetermined position of the mask to form plugging sections by immersing the masked structure in plugging slurry at one end face to which the holed mask has been adhered, thereby the plugging slurry penetrates into the holes to form the plugging sections, and dry plugging slurry inclusive of one attached on the mask to solidify plugging slurry, comprising: a brushing apparatus for removing the solidified plugging slurry having been attached to the mask of the masked plugging honeycomb structure; an air injection apparatus for injecting, after removing the solidified plugging slurry having been attached to the mask of the masked plugging honeycomb structure, air from the opposite end face-side of the one end face to a folded surplus part of the mask at the one end face to raise the folded surplus part of the mask; a mask peeling apparatus for holding the folded surplus part raised by the air injection apparatus to peel the mask from the masked plugging honeycomb structure; and a carrying apparatus for carrying the masked plugging honeycomb structure from the brushing apparatus to the mask peeling apparatus.

[2] The automatic mask peeling apparatus according to [1], wherein: the brushing apparatus includes: an end face brush for removing the solidified plugging slurry having been attached to the end face-side of the masked plugging honeycomb structure; a first side face brush for removing the solidified plugging slurry having been attached to a pair of opposing side faces of the masked plugging honeycomb structure; and a second side face brush for removing the solidified plugging slurry having been attached to another pair of opposing side faces of the masked plugging honeycomb structure.

[3] The automatic mask peeling apparatus according to [2], wherein: the automatic mask peeling apparatus includes a honeycomb rotation apparatus that is positioned between the first side face brush and the second side face brush and that causes the masked plugging honeycomb structure to be rotated 90 degrees around the axis of the masked plugging honeycomb structure.

LEGEND FOR REFERENCE NUMERALS

10 Automatic mask peeling apparatus 21 End face 21a and 21b Side 24 Mask 24a and 24 fold section 26 Base plate 28

Brush line 30 Brushing apparatus 31 End face brush 32 and 33 Side face brush 34 Nozzle 35 Air piping 36 Air injection apparatus 40 Holding apparatus 41 Holding nail 43 First straight driving apparatus 43a Connecting section 43b First shaft 43c First cylinder 43d First extension coil spring 45 Second straight driving apparatus 45a Support body 45a1 First cylinder supporting face 45b Second shaft 45c Second cylinder 45d Second extension coil spring 47 Third straight driving apparatus 47a Support plate 47b Third shaft 47c Third cylinder 50 Mask peeling apparatus 51 Cell 52 Partition walls 55 Carrying apparatus 60 and 61 Honeycomb rotation apparatus 63 Contact plate 64 Arm 65 Arm driving apparatus 100 Plugging honeycomb structure 101 and 120 Honeycomb structure 200 Masked plugging honeycomb structure

DESCRIPTION OF THE PREFERRED EMBODIMENTS

The automatic mask peeling apparatus of the present invention can peel a mask automatically and without leaving any part of the mask on the end face of a masked honeycomb structure therefrom, by peeling the mask while holding a raised end of a folded surplus part of the mask after solidifying plugging slurry having been attached to a mask of a masked plugging honeycomb structure and removing thus solidified slurry, then, blowing air from the opposite end face side of one end face of the masked plugging honeycomb structure to the folded surplus part of the mask to raise the folded surplus part from the one end face.

The following section will describe the best mode for carrying out the present invention. However, the present invention is not limited to the following embodiments. It should be understood that an appropriate modification or change of the following embodiments made based on the general knowledge of those skilled in the art without deviating from the intention of the invention is also included in the scope of the present invention.

[1] Automatic Mask Peeling Apparatus

Figure 1:
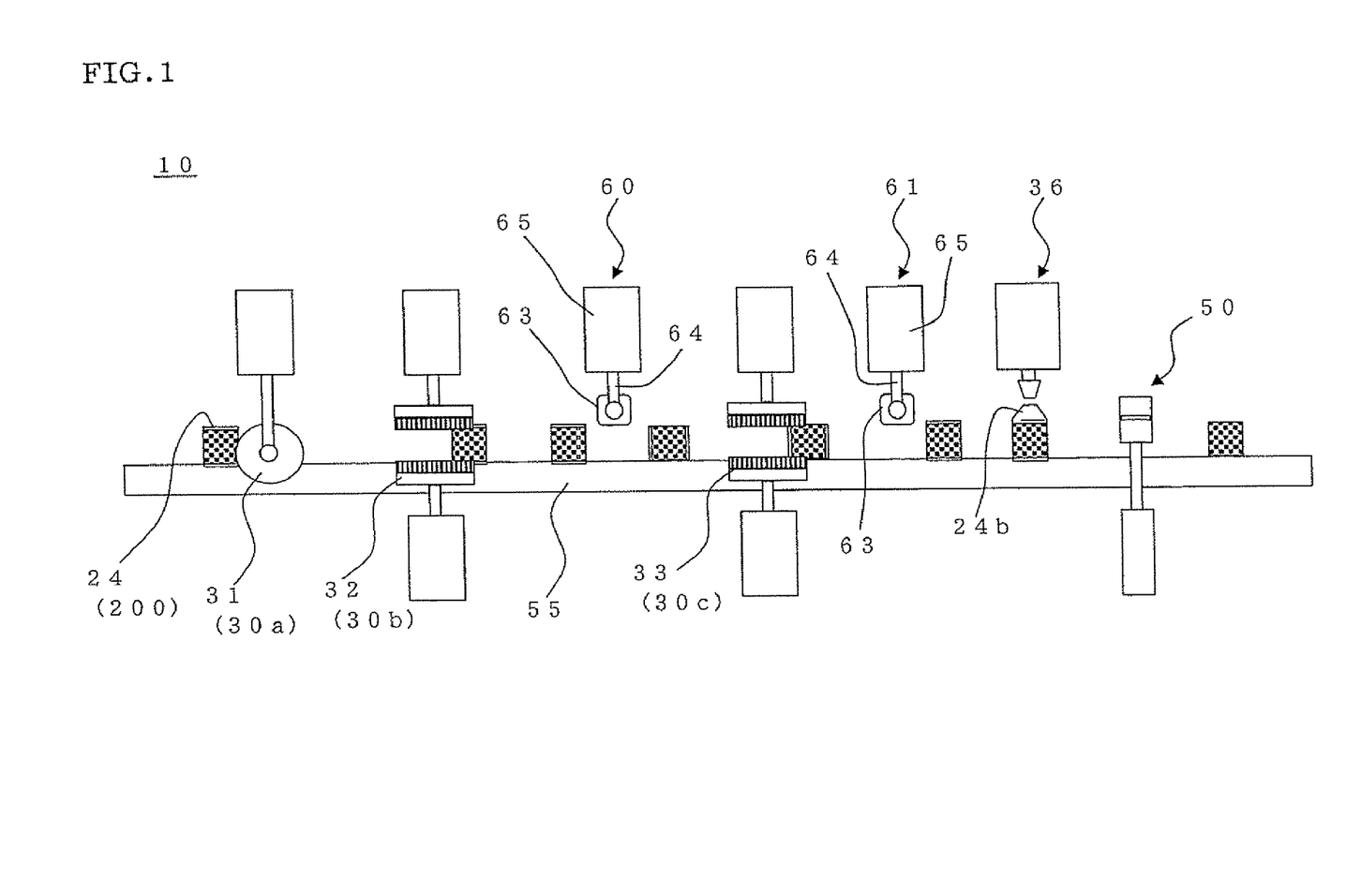
FIG. 1 is a side view schematically illustrating one embodiment of an automatic mask peeling apparatus of the present invention.
Figure 2A:
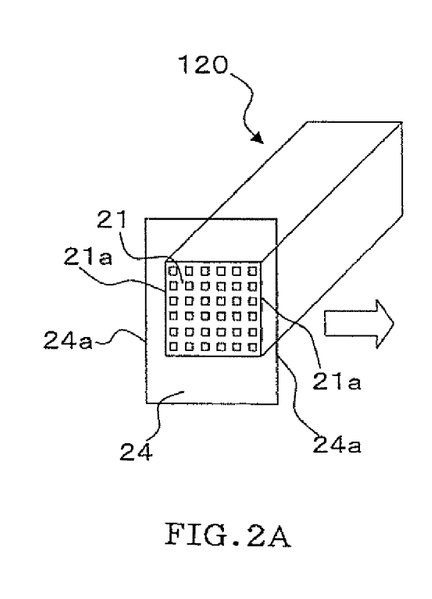
FIGS. 2A to 2D are a perspective view illustrating a step of folding a mask of a masked plugging honeycomb structure.
Figure 2B:
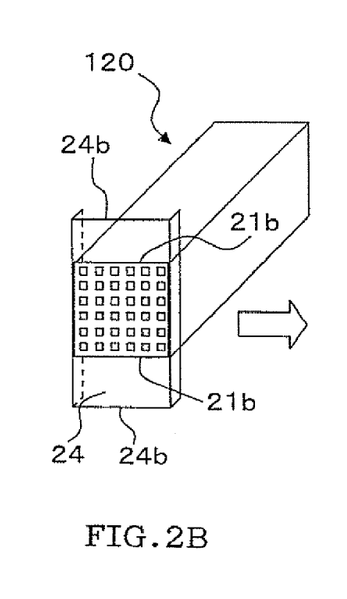
Figure 2C:
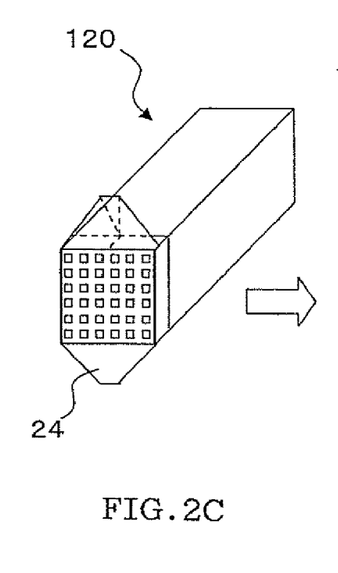
Figure 2D:
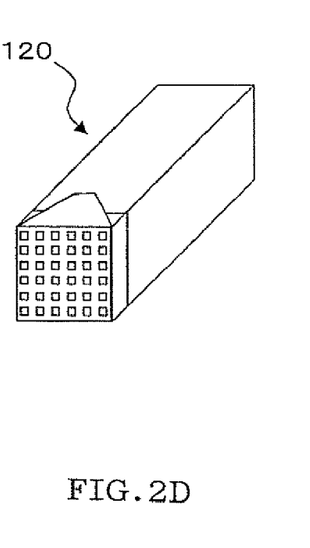

As shown in FIG. 1, according to one embodiment of the automatic mask peeling apparatus of the present invention, an automatic mask peeling apparatus 10 is provided. The automatic mask peeling apparatus 10 according to the present invention can be used for peeling automatically a mask(s) used for formation of plugging section(s) at the predetermined portions of the cells at both ends of a honeycomb structure, which is used for carrier for catalyst. Prior to the formation of the plugging section(s), usually a mask is adhered to at least one end face of a quadrangular prism-like honeycomb structure having porous partition walls for dividing a plurality of cells. Preferably, each of the both end faces is attached by a mask, respectively. This mask has an area larger than that of the one end face of the honeycomb structure, as is discussed in detail afterward. Then, a plural number of holes is opened at a predetermined position of this mask. An end face to which the mask has been adhered is immersed in plugging slurry to make the slurry penetrate into the predetermined cells through the holes to form the plugging sections after drying the penetrated slurry into the cells. Thereafter the mask 24 should be peeled from a masked plugging honeycomb structure 200. The peeling operation of the mask can be automated by using the present automatic peeling apparatus 10 which includes: a brushing apparatus 30 for removing solidified plugging slurry having been attached to the mask 24 of the masked plugging honeycomb structure 200; an air injection apparatus 36 for injecting, after the solidified plugging slurry having been attached to the mask 24 of the masked plugging honeycomb structure 200 is removed, air from the opposite end face-side of the one end face to raise a folded surplus part of the mask from the one end face; a mask peeling apparatus 50 for holding the part raised by the air injection apparatus 36 to peel the mask 24 from the masked plugging honeycomb structure 200; and a carrying apparatus 55 for carrying the masked plugging honeycomb structure 200 from the brushing apparatus 30 to the mask peeling apparatus 50. Through the configuration as described above, the mask adhered to the end face of the masked plugging honeycomb structure can be automatically peeled without causing a part of the mask to be left on the end face.

The present automatic mask peeling apparatus is an apparatus to peel a mask of a masked plugging honeycomb structure. The masked plugging honeycomb structure to be used as an object for peeling operation using the present automatic mask peeling apparatus may be obtainable by the following process. At least a sheet of a mask is adhered to either end face of a quadrangular prism-like honeycomb structure having porous partition walls for dividing a plurality of cells. This mask has an area larger than that of the one end face. Then, a plural number of holes is opened at a predetermined position of this mask. The end face to which the mask is adhered is immersed in plugging slurry to make the slurry penetrate into the predetermined cells through the holes into cells to form the plugging sections after drying the penetrated slurry into the cells. Preferably, each of both end faces is attached by a sheet of a mask, respectively.

The quadrangular prism-like honeycomb structure has porous partition walls for dividing a plurality of cells. This structure can be manufactured, for example, by kneading ceramics powders (e.g., silicon carbide, cordierite) with organic binder and water for example to provide clayey porcelain clay. This clay is formed to have a honeycomb-like shape by an extruder for example and is dried.

The mask adhered to the one end face of the quadrangular prism-like honeycomb structure has an area larger than that of the one end face and is provided so as to cover the entire end face. The mask adhered to the one end face of the honeycomb structure preferably has an area for example so that a ratio of a part of the mask protruding from the end face to the area of the end face is 1.2 to 4.0. This ratio is more preferably in a range from 2.0 to 3.5. This ratio is particularly preferably in a range from 2.4 to 3.0. The ratio lower than 1.2 causes a part that can be held by the mask peeling apparatus to be excessively small, causing a risk where the mask cannot be peeled securely. The ratio exceeding 4.0 on the other hand causes a risk where the end face of the honeycomb structure may be broken.

The material of the mask is not particularly limited. The mask is preferably made of material that can be easily subjected to a thermal processing for forming a plural number of holes, including polypropylene (PP), polyethylene terephthalate (PET), polyimide, or Teflon®. The mask preferably includes an adherent layer. The adherent layer is preferably made of acrylic resin, rubber-base material (e.g., rubber mainly composed of natural rubber or synthetic rubber), or silicon-base resin. The adherent layer has an adhesive force measured based on JIS Z0237 that is preferably in a range from 1.2 to 2.5 N/cm, more preferably in a range from 1.4 to 2.3 N/cm, and particularly preferably in a range from 1.6 to 1.9 N/cm. If the adhesive force of adherent layer is lower than 1.2 N/cm, there may be a fear that the mask is peeled during the brushing process. If the adhesive force exceeds 2.5 N/cm on the other hand, there may be a fear that the mask can not be peeled smoothly from the end face of the honeycomb structure. The mask has a thickness that is preferably in a range from 20 to 50 μm and that is more preferably in a range from 30 to 40 µm. If the thickness of the mask is lower than 20 µm, there may be a fear that the mask may not be folded accurately. On the other hand, if the thickness exceeds 50 µm, there may be a fear that the surplus part of the mask can not kept in a folded state at the end face of the structure.

As shown in FIG. 2, the mask is preferably adhered and is folded so as to cover the entire end face. FIG. 2 is a perspective view illustrating steps to adhere the mask so as to cover the entire end face and to fold a surplus part of the mask at the end face. First, as shown in FIG. 2A, a sheet of a mask 24 is placed over one of both end faces 21 of a quadrangular prism-like honeycomb structure 120 having a square-like end face 21 so that the respective four end faces 21 of the honeycomb structure 120 are parallel to the four ends of the respective rectangular transparent mask 24. Then, the mask 24 is adhered. Next, as shown in FIG. 2B, both end sections 24a in the short side direction of the mask 24 are folded to the honeycomb structure 120 along a pair of parallel sides 21a of the end face 21. Next, as shown in FIG. 2C, a part of both end sections 24b in the longitudinal direction of the mask 24 is folded to the honeycomb structure 120 so that both end sections 24b in the longitudinal direction have a trapezoidal shape. Next, as shown in FIG. 2D, both end sections 24b in the longitudinal direction of the trapezoidal shape are folded to the honeycomb structure 120 along a pair of parallel sides 21b of the end face 21. By adhering and folding the mask so as to cover the entire end face as described above, air can be injected between both trapezoidal shape-like end sections 24b in the longitudinal direction shown in FIG. 2D (i.e., the surplus part) and the side face of the masked plugging honeycomb structure to easily raise the folded surplus part of the mask from the end face and the raised part can be easily held by the mask peeling apparatus. Note that the above-mentioned operation for adhering and folding a mask can be done at the both ends at the same time or be repeated twice end by end when the plugging sections are formed at both ends of the honeycomb structure.

A plural number of holes is opened in a predetermined position of the mask adhered to the end face (i.e., a part covering a cell at which a plugging section should be provided). A method for opening a plural number of holes can be selected from among conventionally-known methods such as a laser processing using an image processing. By opening a plural number of holes in the mask as described above, the respective end sections of the predetermined cells can be filled with plugging slurry when immersed in the plugging slurry.

The plugging slurry may be prepared, for example, by mixing ceramics powders, a dispersing medium (e.g., water), and optionally additives such as a binder, deflocculation agent, or resin balloon. The ceramics powders may be made of not particularly-limited material but is preferably made of the same material as that of the honeycomb structure. The binder may be polyvinyl alcohol or methylcellulose for example. The drying after immersion in the plugging slurry is preferably carried out at 100 to 140° C. for 20 to 60 minutes, more preferably at 110 to 130° C. for 20 to 40 minutes, and particularly preferably at 115 to 125° C. for 25 to 35 minutes.

[1-1] Brushing Apparatus

The brushing apparatus constituting the automatic mask peeling apparatus of this embodiment is used to remove solidified plugging slurry having been attached to the mask of the masked plugging honeycomb structure. By using the brushing apparatus to remove the solidified plugging slurry having been attached to the mask, the folded surplus part of the mask can be raised and the mask can be easily held by the mask peeling apparatus. At the same time, no risk is caused where the mask being peeled may be broken.

The brushing apparatus constituting automatic mask peeling apparatus of this embodiment can include, for example, a pair of brushes, a brush driving apparatus for driving the rotation of the brushes, and a column-like connecting body that connects the pair of brushes to the brush driving apparatus and that transmits the rotary drive force of the brush driving apparatus to the pair of brushes. According to the brushing apparatus as described above, the pair of brushes rotated by the brush driving apparatus can be abutted to the surfaces of the masks to remove the solidified plugging slurry having been attached to the masks. Note that only one of brushes from the pair of brushes may be operated when the mask is adhered on only one of both end faces of the honeycomb structure.

The pair of brushes of the brushing apparatus is preferably composed of three pairs of brushes. Specifically, the three pairs of brushes are preferably composed of: an end face brush for removing solidified plugging slurry attached to the end face of the masked plugging honeycomb structure; the first side face brush for removing solidified plugging slurry attached to a pair of opposing side faces of the masked plugging honeycomb structure; and the second side face brush for removing solidified plugging slurry attached to the other pair of opposing side faces of the masked plugging honeycomb structure. The configuration including the end face brush, the first side face brush, and the second side face brush as described above can securely remove solidified plugging slurry attached to an end face and a side face of the masked plugging honeycomb structure. Thus, the mask can be peeled by the mask peeling apparatus in a further easier manner.

The brushing apparatus as described above may be designed so that each brush has a brush driving apparatus and a connecting body or each brush also may be connected to one brush driving apparatus via a connecting body. FIG. 1 illustrates an example showing brushing apparatuses 30a, 30b, and 30c in which the respective brushes 31, 32, and 33 have brush driving apparatuses and connecting bodies, respectively.

The brushing apparatus may have a brush that is provided, for example, by arranging a plurality of brush lines on one face of a circular disc-like base plate to provide the entire circular column-like shape (hereinafter may be referred as "short circular column-like brush") or by arranging a plurality of brush lines on a surface of a circular column-like axis material to provide the entire circular column-like shape.

When the short circular column-like brush is used, the brush preferably has the overall size having a diameter in a range from 30 to 150 mm, more preferably in a range from 40 to 100 mm, and particularly preferably in a range from 60 to 80 mm. The diameter smaller than 30 mm reduces a part upon which the brush acts (i.e., a part at which solidified plugging slurry attached to the surface of the mask is abutted to the brush in the brushing process), causing a risk of a deteriorated efficiency or an unremoved part. The diameter exceeding 150 mm on the other hand causes an increased centrifugal force of the brush, causing a risk where an excessive system rigidity is required. The short circular column-like brush preferably has a length in a range from 10 to 50 mm, more preferably in a range from 15 to 40 mm, and particularly preferably in a range from 20 to 30 mm. The length shorter than 10 mm causes a reduced pliability of brush hair (brush line), causing a risk where the honeycomb structure may be damaged. The length longer than 50 mm on the other hand causes a case where the pliability of the brush hair significantly changes as the brush is used, causing a risk where the condition cannot be maintained. The brush line has a diameter preferably in a range from 0.2 to 0.8 mm, more preferably in a range from 0.3 to 0.6 mm, and particularly preferably in a range from 0.4 to 0.5 mm. The brush line having a diameter smaller than 0.2 mm causes an excessively-pliable brush line during the brushing process, thus causing a risk where solidified plugging slurry attached to the surface of the mask cannot be removed. The brush line having a diameter larger than 0.8 mm on the other hand causes an excessively-hard brush line, thus causing a risk where the honeycomb structure may be damaged during the brushing process.

The short circular column-like brush is rotated with a rotation frequency preferably in a range from 100 to 1000 rpm, more preferably in a range from 200 to 700 rpm, and particularly preferably in a range from 300 to 500 rpm. If the rotation frequency is lower than 100 rpm, which is an extremely-slow rotation frequency, there may be a fear of an insufficient removal. The rotation frequency exceeding 1000 rpm on the other hand causes an excessively-high rotation frequency, causing a risk of a short brush life and a risk where the honeycomb structure may be damaged. The brush line may be made of material such as nylon, polypropylene, vinyl chloride, polyester, or animal fiber (e.g., horse hair), among which nylon is preferred because nylon has superior abrasion resistance and flexibility.

Figure 3:
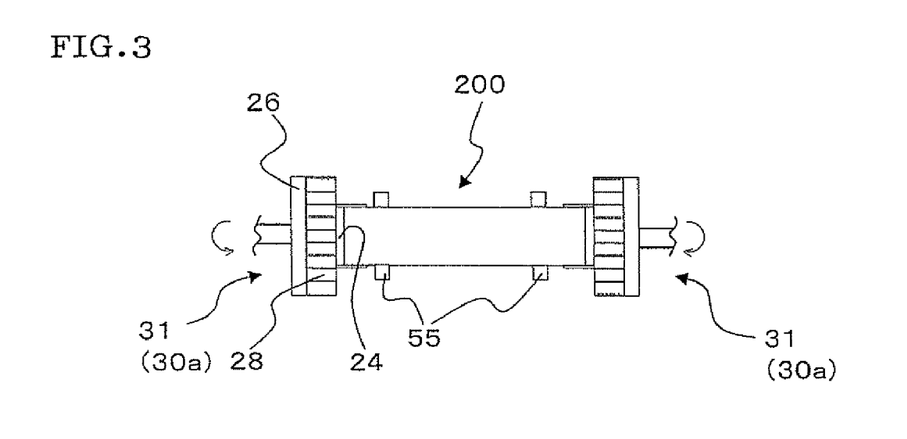
FIG. 3 is a top view illustrating how solidified plugging slurry having been attached to the end face of the masked plugging honeycomb structure is removed.

The brushing apparatus 30a shown in FIG. 3 shows an example in which a plurality of brush lines 28 are provided on one face of a circular disc-like base plate 26 so that the entirety has a pair of circular column-like end face brushes 31. FIG. 3 is a top view illustrating how solidified plugging slurry attached to end faces of the masked plugging honeycomb structure is removed. Specifically, FIG. 3 is a top view illustrating how the pair of end face brushes 31 are rotated around the axes to abut the end face brushes 31 to the masks 24 to remove solidified plugging slurry attached to the end faces of the masked plugging honeycomb structure 200.

Figure 4:
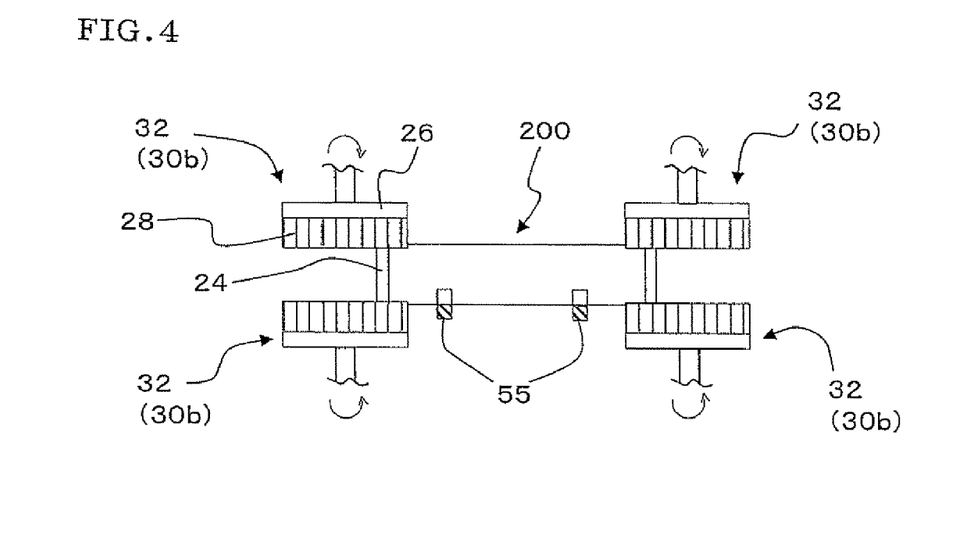
FIG. 4 is a side view illustrating how solidified plugging slurry having been attached to a pair of opposing side faces of the masked plugging honeycomb structure is removed.

The brushing apparatus 30b shown in FIG. 4 shows an example in which a plurality of brush lines 28 are provided on one face of the circular disc-like base plate 26 to provide the overall configuration having a pair of circular column-like first side face brushes 32. FIG. 4 is a side view illustrating how solidified plugging slurry attached to a pair of opposing side faces of the masked plugging honeycomb structure is removed. Specifically, FIG. 4 is a side view illustrating how the two pairs of first side face brushes 32 are rotated around the axes to abut the first side face brushes 32 to the mask 24 to remove solidified plugging slurry attached to a pair of opposing side faces of the masked plugging honeycomb structure 200.

When the first side face brush and the second side face brush are used, the automatic mask peeling apparatus of this embodiment preferably further includes a honeycomb rotation apparatus that is positioned between the first side face brush and the second side face brush to rotate the masked plugging honeycomb structure 90 degrees around the axis of the masked plugging honeycomb structure. The honeycomb rotation apparatus can rotate the masked plugging honeycomb structure 90 degrees as described above. Thus, when a pair of first side face brushes is provided at upper and lower positions in a vertical direction for example, then a pair of second side face brushes also can be provided at upper and lower positions in a vertical direction as in the first side face brushes. Specifically, an advantage is obtained where a uniform layout of the first side face brushes and the second side face brushes can prevent the brushing apparatus from having a complicated design.

The honeycomb rotation apparatus of automatic mask peeling apparatus of this embodiment may include, for example, a pair of contact plates abutted to both end faces of the masked plugging honeycomb structure; a pair of arms connected to the contact plates; an arm driving apparatus that is connected to the arms and that opens or closes and elevates the arms; an elevation apparatus; and a rotation driving apparatus for rotating the contact plates in the planes.

[1-2] Air Injection Apparatus

Figure 5A:
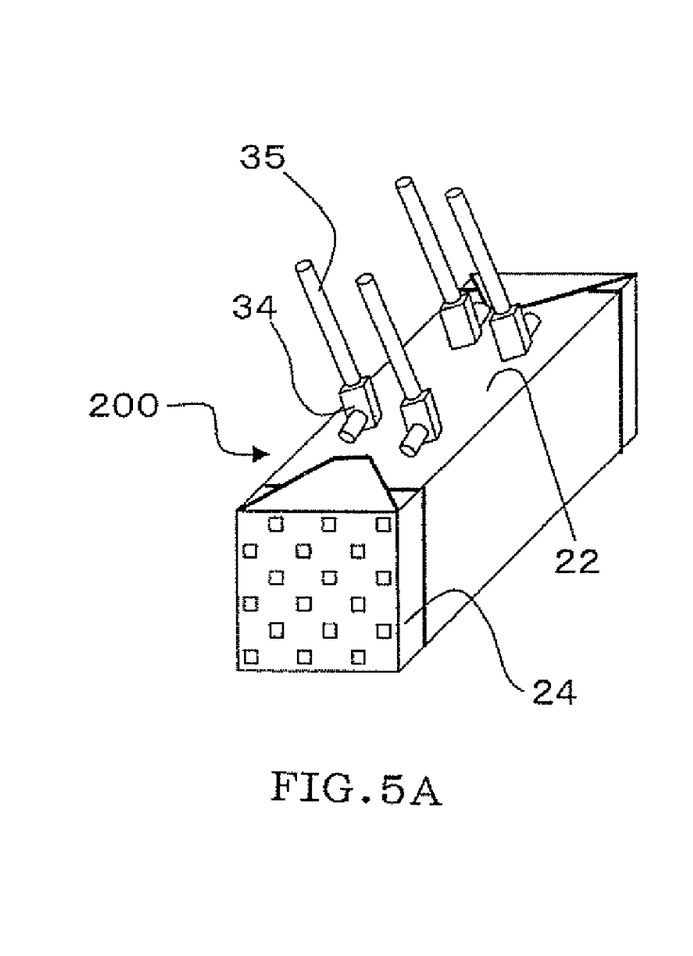
FIG. 5A is a perspective view illustrating a status where air is not yet injected.
Figure 5B:
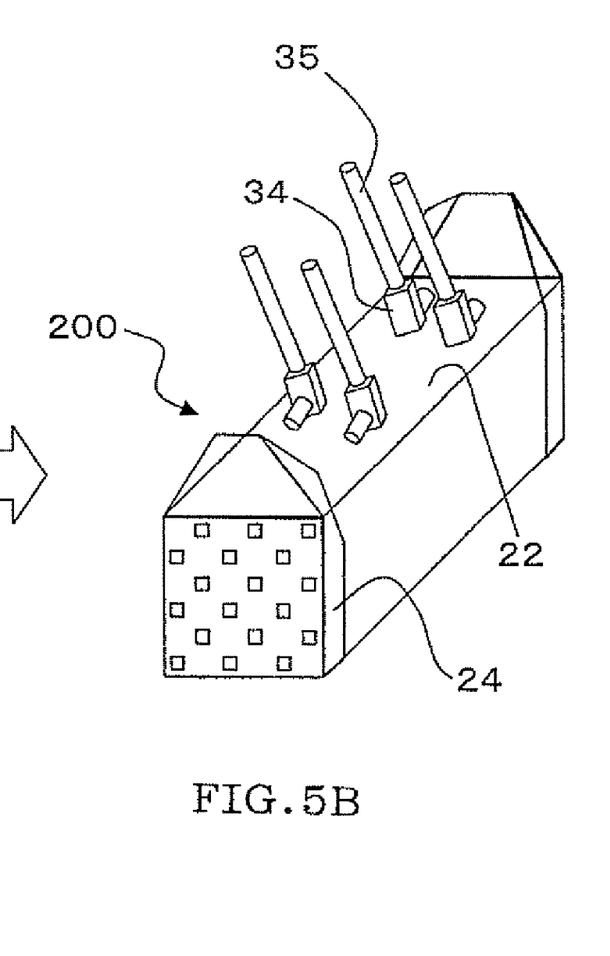
FIG. 5B is a perspective view illustrating a status after the injection of air to a folded surplus part of the mask.

An air injection apparatus constituting the automatic mask peeling apparatus of this embodiment is used to inject, after the solidified plugging slurry attached to the mask of the masked plugging honeycomb structure is removed, air from the opposite end face-side of one end face to a folded surplus part of the mask from the one end face to raise the folded surplus part of the mask. By using the air injection apparatus to raise the folded surplus part of the mask, the mask peeling apparatus can easily hold the folded surplus part of the mask to securely peel the mask. The expression of "raise the folded surplus part of the mask" herein means an action to raise the folded surplus part of the mask folded as shown in FIG. 2 for example. FIG. 5A is a perspective view illustrating a status where air is not yet injected to the folded surplus part of the mask folded as shown in FIG. 2. FIG. 5B is a perspective view illustrating a status after the injection of air between both trapezoidal end sections 24b in the longitudinal direction and the side face 22 of the masked plugging honeycomb structure 200. The air injection causes both trapezoidal end sections 24b in the longitudinal direction (i.e., the folded surplus part of the masks) to be raised. By injecting air not to both end sections 24a in the short side direction but to a space between both trapezoidal end sections 24b in the longitudinal direction and the side face of the masked plugging honeycomb structure, the folded surplus part of the masks can be raised easily.

The air injection apparatus injects air with a pressure preferably in a range from 0.2 to 0.9 MPa, more preferably in a range from 0.3 to 0.6 MPa, and particularly preferably in a range from 0.3 to 0.5 MPa. If the pressure is lower than 0.2 MPa, there is a fear that the folded surplus part of the mask of the mask may not be raised. If the pressure exceeds 0.9 MPa on the other hand, there is a fear that the mask may be broken. The air injection time is preferably in a range from 0.2 to 2.0 second, more preferably in a range from 0.3 to 1.5 second, and particularly preferably in a range from 0.5 to 1.0 second. The air injection time shorter than 0.2 second causes a risk where the folded surplus part of the mask of the mask may not be raised. The air injection time longer than 2.0 second on the other hand causes a risk where the mask may be broken. The air injection is carried out preferably 1 to 3 times and more preferably 1 time. Arbitrary air injection angle and air injection speed may be used so long as air injected from the opposite end face-side of one end face can raise the folded surplus part of the mask (i.e., the air injected by the air injection apparatus can enter the space between the folded surplus part of the mask and the side face of the masked plugging honeycomb structure to raise the folded surplus part of the mask). However, the air injection angle (i.e., an angle formed by the side face of the masked plugging honeycomb structure and a direction in which air is injected) is preferably in a range from 5 to 60 degrees and more preferably in a range from 15 to 45 degrees. The air injection speed is preferably in a range from 4 to 12 m/second and more preferably in a range from 6 to 9 m/second.

The air injection apparatus may be, for example, an air blow apparatus that includes a nozzle and an air piping connecting this nozzle to a body. For example, FIGS. 5A and 5B are a perspective view illustrating a nozzle 34 and a part of an air piping 35 of the air blow apparatus that includes two pairs of the nozzles 34 and air pipings 35. Indeed, the number of the nozzles may be chosen, taking into the actual use conditions consideration.

[1-3] Mask Peeling Apparatus

Figure 6:
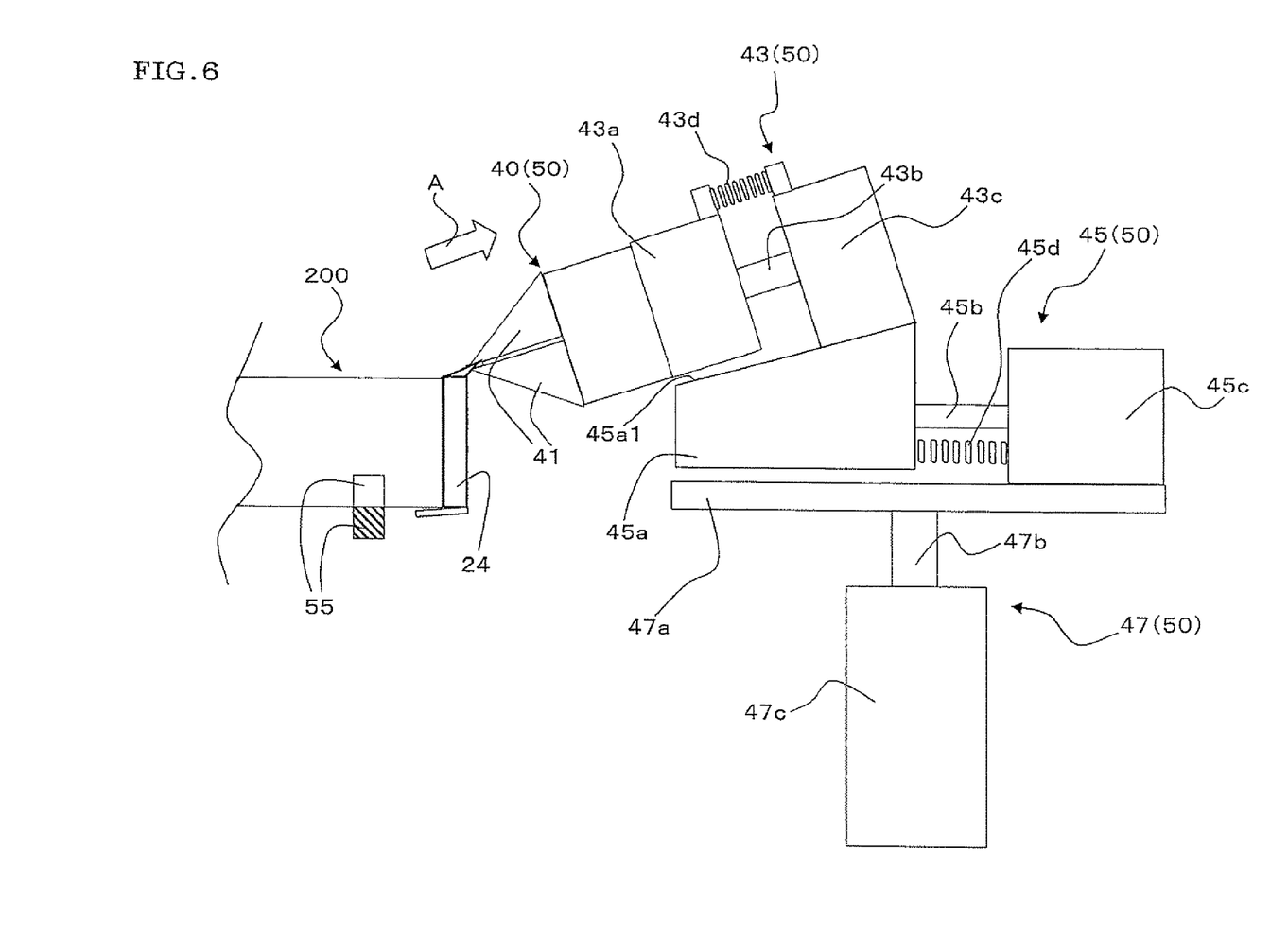
FIG. 6 is a side view illustrating how the mask peeling apparatus of the automatic mask peeling apparatus of this embodiment peels the mask of the masked plugging honeycomb structure.

A mask peeling apparatus constituting the automatic mask peeling apparatus of this embodiment is used to hold the part raised by the air injection apparatus to peel the mask from the masked plugging honeycomb structure. The mask peeling apparatus illustratively may be a mask peeling apparatus 50 as shown in FIG. 6. The mask peeling apparatus 50 includes: a pair of holding nails 41 having holding faces for holding the folded surplus part of the mask from the end face; a holding apparatus 40 including a nail driving apparatus for opening and closing the holding nails 41; a first straight driving apparatus 43 for moving the holding apparatus 40; a second straight driving apparatus 45 for moving the first straight driving apparatus 43; and a third straight driving apparatus 47 for moving the second straight driving apparatus 45. According to the mask peeling apparatus 50 having the configuration as described above, the mask can be easily peeled from the masked plugging honeycomb structure without damaging the honeycomb structure. An advantage is also provided where a part of the mask is not left on the end face of the honeycomb structure. FIG. 6 is a side view illustrating a status where the mask peeling apparatus 50 of the automatic mask peeling apparatus 10 peels the mask 24 of the masked plugging honeycomb structure 200. Note that FIG. 6 is a partial showing for simplification since the masks 24 adhered at both sides can be peeled at same time.

The pair of holding nails has a holding force preferably in a range from 0.3 to 0.7 MPa, more preferably in a range from 0.4 to 0.6 MPa, and particularly preferably in a range from 0.5 to 0.55 MPa. If the holding force is lower than 0.3 MPa, there is a fear that the mask easily slips off from the holding nails, this would result in the failure to peeling the mask. If the holding force exceeds 0.7 MPa, on the other hand, there is a fear that the holding nails are forcedly pulled down while the mask is still adhered to the honeycomb structure end face, thus causing a risk where a part of the honeycomb structure may be broken. Specifically, when the adhesive force of the mask is excessively-high and the holding force is higher than the adhesive force, the mask will be forcedly peeled from the end face; this would result in the undesirable removal of a part of the end face of the structure. The holding faces of the pair of holding nails are preferably subjected to a nonadhesive processing for preventing a case where a peeled mask is attached to the faces. By the nonadhesive processing as described above, the mask can be securely held. The nonadhesive processing may be, for example, a topical coating, a fluorine resin coating (e.g., PTFE, PFA, FEP).

As shown in FIG. 6, the first straight driving apparatus 43 may include: a connecting section 43a connected to the holding apparatus 40; a first column-like shaft 43b that has one end connected to the connecting section 43a and that moves the connecting section 43a in a straight direction; a first cylinder 43c that has a concave section to which or from which the first shaft 43b can be inserted or pulled out and the first shaft 43b is inserted to this concave section; and a first cylindrical extension coil spring 43d. In the first cylindrical extension coil spring 43d, the center axis is provided along the center axis of the first shaft 43b, one end section is connected to the connecting section 43a, and the other end section is fixed to the first cylinder 43c. The first cylindrical extension coil spring 43d has a predetermined spring constant for generating a force to move the connecting section 43a toward the first cylinder 43c. The first straight driving apparatus 43 uses the first extension coil spring that allows the connecting section 43a to move in accordance with a speed at which the mask is peeled from the end face of the honeycomb structure. Thus, an advantage is obtained according to which a risk of a broken mask is eliminated and a part of the mask can be prevented from being left on the end face of the honeycomb structure.

In an example shown in FIG. 6, the first straight driving apparatus 43 has one first extension coil spring 43d. However, the first straight driving apparatus 43 also may have a plurality of the first extension coil springs 43d. The column may be, for example, a circular column-like shape, an elliptic cylindrical shape, a triangular prism-like shape, a quadrangular prism-like shape, or a polygonal column-like shape, among which the circular column-like shape is preferred.

The first extension coil spring of the first straight driving apparatus may be, for example, the one having a diameter from 0.8 to 1.1 mm (preferably 0.9 to 1.0 mm) and having a length from 7 to 15 mm (preferably 9 to 13 mm).

The first extension coil spring of the first straight driving apparatus has a tensile force that is preferably in a range from 100 to 200 to the mask adhesive force of 100, more preferably in a range from 110 to 180, and particularly preferably in a range from 120 to 150.

Specifically, the first extension coil spring of the first straight driving apparatus has, when the mask adhesive force is 10 to 20 N, a spring constant that is preferably in a range from 0.3 to 1.5 N/mm, more preferably in a range from 0.4 to 1.2 N/mm, and particularly preferably in a range from 0.5 to 0.9 N/mm. The spring constant within this range can provide an advantage of a reduced speed change of the connecting section 43a moving in a straight manner. The spring constant lower than 0.3 N/mm causes a risk where the spring force is weaker than the mask adhesive force, thus causing a risk where the mask cannot be peeled from the end face of the honeycomb structure. The spring constant higher than 1.5N/mm on the other hand causes a risk where the effect by the spring cannot be obtained. Specifically, an excessively-high spring force makes it difficult for the connecting section 43a to slowly recede (or to move toward the first cylinder 43c with a predetermined speed change), thus causing a risk where the mask cannot be peeled from the end face of the honeycomb structure without a part of the mask being left on the end face.

The travel distance for which the connecting section may travel by the first shaft is preferably in a range from 2 to 15 mm, more preferably in a range from 5 to 12 mm, and particularly preferably in a range from 8 to 10 mm. The travel distance shorter than 2 mm causes a risk where the mask cannot be peeled from a corner of the end section of the honeycomb structure. The travel distance longer than 15 mm on the other hand causes a risk where the mask may be broken in the middle of the peeling process. The time required for the connecting section to travel the distance is preferably in a range from 0.2 to 2.0 second, more preferably in a range from 0.5 to 1.5 second, and particularly preferably in a range from 0.8 to 1.2 second. The travel time shorter than 0.2 second causes the connecting section to travel with an excessively-fast speed and thus the mask is slipped off from the holding nails, thus causing a risk where the mask cannot be peeled. The travel time longer than 2.0 second on the other hand causes the entire takt to be long, thus causing a risk of reduced productivity.

The first cylinder may be, for example, an air cylinder, a hydraulic cylinder, or an electric cylinder, among which the air cylinder is preferred because the air cylinder can be controlled easily. According to the first straight driving apparatus, until a mask is held by the holding nails, the first cylinder is used to tense the first extension coil spring. After the mask is held by the holding nails, the spring force of the first extension coil spring is used to cause, without allowing the first cylinder to apply a force to tense the first extension coil spring, the connecting section (holding nails) to recede. A second cylinder that is described later also moves in the same manner.

As shown in FIG. 6, the second straight driving apparatus 45 may include: a support body 45a that is connected to the first cylinder 43c of the first straight driving apparatus 43 and that supports the first straight driving apparatus 43; a column-like second shaft 45b that has one end fixed to the support body 45a and that causes the support body 45a to move in a horizontal direction; a second cylinder 45c that has a concave section to which or from which the second shaft 45b can be inserted or pulled out and the second shaft 45b is inserted to this concave section; and a second cylindrical extension coil spring 45d. In the second extension coil spring 45d, the center axis is provided along the center axis of the second shaft 45b, one end section is fixed to the support body 45a, and the other end section is fixed to the second cylinder 45c. The second extension coil spring 45d has a predetermined spring constant for generating a force for moving the support body 45a to the second cylinder 45c in the horizontal direction. The second straight driving apparatus 45 uses the second extension coil spring 45d to move the support body 45a in accordance with a speed at which the mask is peeled from the end face of the honeycomb structure. This provide an advantage that a risk is eliminated where the mask may be broken and a situation can be eliminated where a part of the mask is left on the end face of the honeycomb structure.

The support body 45a has a first cylinder supporting face 45a1 having 0 to 45 degrees to the horizontal direction. By providing the first cylinder 43c (i.e., the first straight driving apparatus 43) on the first cylinder supporting face 45a1, when the connecting section 43a of the first straight driving apparatus 43 is moved in the straight direction, the mask 24 held by the pair of the holding nails 41 is pulled up in an oblique direction. By pulling the mask 24 in the oblique direction as described above, the force for pulling the folded surplus part of the mask of the mask is dispersed, thus providing an advantage that the mask can be easily peeled.

The second extension coil spring of the second straight driving apparatus has a spring constant that is preferably in a range from 0.10 to 1.00 N/mm, more preferably in a range from 0.15 to 0.50 N/mm, and particularly preferably in a range from 0.20 to 0.25 N/mm. The spring constant lower than 0.10 N/mm causes a spring force weaker than the mask adhesive force, thus causing a risk where the first cylinder 43c recedes incompletely. The spring constant higher than 1.00 N/mm on the other hand causes an excessively-high spring force, thus causing a risk where the spring does not achieve an intended function.

The travel distance for which the support body may travel by the second shaft is preferably in a range from 1 to 55 mm, more preferably in a range from 35 to 50 mm, and particularly preferably in a range from 40 to 45 mm. The travel distance shorter than 1 mm causes the mask to be pulled down in a substantially vertical direction, thus causing a risk where the mask or the honeycomb structure may be broken. The travel distance longer than 55 mm on the other hand causes the entire takt to be long, thus causing a risk of reduced productivity. The travel time required for the support body to travel the distance is preferably in a range from 0.3 to 5.0 second, more preferably in a range from 0.5 to 4.5 second, and particularly preferably in a range from 1.2 to 3.5 second. The travel time shorter than 0.3 second causes a risk where the mask or the honeycomb structure may be broken. The travel time longer than 5.0 second on the other hand causes the entire takt to be long, thus causing a risk of reduced productivity.

As shown in FIG. 6, the third straight driving apparatus 47 may include: a support plate 47a that is connected to the second cylinder 45c of the second straight driving apparatus 45 to support the second straight driving apparatus 45; a third column-like shaft 47b that has one end fixed to the support plate 47a and that causes the support plate 47a to move in the vertical direction; and a third cylinder 47c that has a concave section to which or from which the third shaft 47b can be inserted or pulled out and the third shaft 47b is inserted to concave section.

The travel distance for which the support plate travels by the third shaft is preferably in a range from 35 to 150 mm, more preferably in a range from 50 to 120 mm, and particularly preferably in a range from 80 to 100 mm. The travel distance shorter than 35 mm causes a risk where mask cannot be sufficiently peeled. The travel distance exceeding 150 mm on the other hand causes the entire takt to be long, thus causing a risk of reduced productivity. The time required for the support plate to travel is preferably in a range from 0.5 to 5.0 second, more preferably in a range from 1.0 to 4.5 second, and particularly preferably in a range from 2.0 to 3.5 second. The travel time shorter than 0.5 second causes a risk where the mask or the honeycomb structure may be broken. The travel time longer than 5.0 second on the other hand causes the entire takt to be long, thus causing a risk of reduced productivity.

Figures 7A, 7B, 7C, 7D:
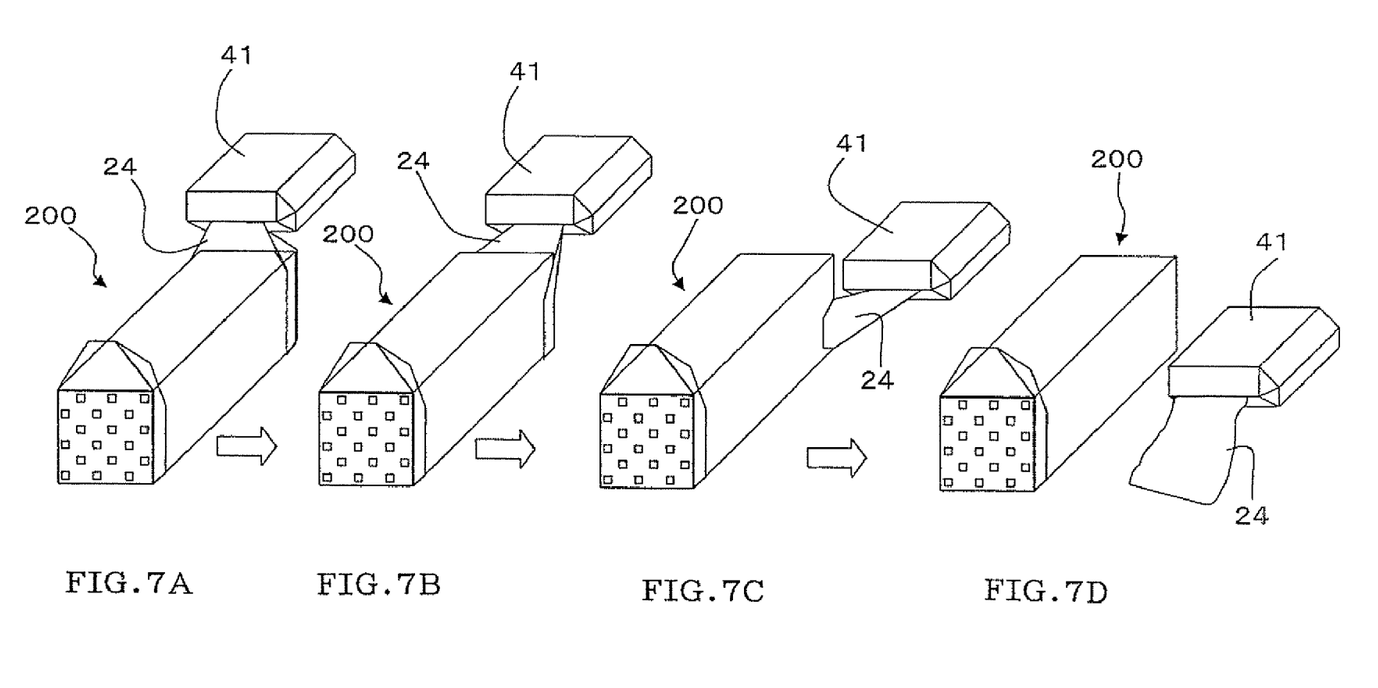
FIGS. 7A to 7D are a perspective view illustrating mask peeling steps by the mask peeling apparatus of FIG. 6.

FIG. 7 is a perspective view illustrating mask peeling steps by the mask peeling apparatus. First, as shown in FIG. 7A, the pair of the holding nails 41 is used to sandwich the part raised by the air injection apparatus. Next, the first shaft is pulled into the first cylinder to move the pair of the holding nails 41 as shown in FIG. 7B. At this time, the mask 24 held by the pair of the holding nails 41 receives a force in a direction shown by the arrow A shown in FIG. 6. Next, a status where the connecting section is at the travel end is maintained for 0.2 to 0.7 second (preferably 0.3 to 0.5 second). Next, the second shaft is pulled into the second cylinder. After 0.2 to 0.7 second (preferably 0.3 to 0.5 second) after the start of the pulling operation, the third shaft is pulled into the third cylinder to downwardly move the second straight driving apparatus in the vertical direction to downwardly move the pair of the holding nails 41 as shown in FIG. 7C. During a process from the status shown in FIG. 7B to the status shown in FIG. 7C, the pair of the holding nails 41 draws a parabolic trajectory. When the pair of the holding nails 41 is downwardly moved as shown in FIG. 7C, the mask 24 can be peeled as shown in FIG. 7D. Note that FIG. 7 is a partial showing for simplification since the masks 24 adhered at both sides can be peeled at same time, too.

[1-4] Carrying Apparatus

The carrying apparatus constituting the automatic mask peeling apparatus of this embodiment is used to carry the masked plugging honeycomb structure from the brushing apparatus to the mask peeling apparatus. The carrying apparatus may be, for example, a bar conveyor or a belt conveyor.

In addition to the respective apparatuses as described above, the automatic mask peeling apparatus of this embodiment also may include another honeycomb rotation apparatus that is different from the above-described honeycomb rotation apparatus and that is provided in front of the air injection apparatus. When the position at which the nozzle of the air injection apparatus is placed does not have the trapezoidal folded surplus part of the mask folded as shown in FIG. 2, this another honeycomb rotation apparatus may be used to rotate the masked plugging honeycomb structure to place the folded surplus part of the mask at the nozzle position of the air injection apparatus.

[2] Mask Peeling Method

The mask peeling method using the automatic mask peeling apparatus of this embodiment may be, for example, a method comprises solidifying surplus plugging slurry having been attached to the mask of the masked plugging honeycomb structure after drying filled plugging slurry in the predetermined cells at its end portions obtained by having been immersing the structure at one end portion thereof in plugging slurry to form the plugged sections; removing the solidified plugging slurry by the brushing apparatus; injecting air from the air injection apparatus to the masked plugging honeycomb structure from which the solidified plugging slurry is removed to raise the folded surplus part of the mask at one end section or both end sections; holding the raised folded surplus part of the mask by the mask peeling apparatus; then, peeling the mask from the masked plugging honeycomb structure. When the mask is peeled by the automatic mask peeling apparatus of this embodiment as described above, the mask adhered to the end face of the honeycomb structure can be automatically peeled without causing a part of the mask to be left on the end face.

EXAMPLE

The following section will specifically describe the present invention based on examples. However, the present invention is not limited to these examples.

Example 1

First, an SiC-made honeycomb structure was prepared that had a quadrangular prism-like shape having a longitudinal length of 36 mm, a lateral length of 36 mm, and a length of 200 mm, and that had a cell density of 46.5 cells/cm$^2$. Next, transparent masks (thickness 40 μm) were adhered to the honeycomb structure so as to cover the entire end face at the both ends of the honeycomb structure, respectively. The masks were made of polyethylene terephthalate (PET) and had a rectangular shape having a longitudinal length of 70 mm and a lateral length of 60 mm. The masks were arranged so that a distance from one side of an end face of the honeycomb structure to the long side of the mask closer to the one side was 12 mm and a distance from one side of the end face of the honeycomb structure to the short side of the mask closer to the one side was 17 mm. Next, the surplus parts of the mask at the both end faces were folded as shown in FIG. 2. Then, a plural number of holes were opened in the portions of the masks covering the cells to which the plugging sections should be provided. Next, both end sections of the honeycomb structure to which the masks were adhered were immersed in plugging slurry respectively, to fill the plugging slurry the predetermined cells at the end sections. Next, the honeycomb structure filled with the plugging slurry was dried at 120° C. for 0.5 hour, thereby providing the masked plugging honeycomb structure 200. The plugging slurry was prepared by mixing 80 parts by mass of SiC powders, 20 parts by mass of metal Si powders, and 2 parts by mass of a binder component.

By the similar method, the masked plugging honeycomb structures 200 were prepared in a quantity of 1000. The masks 24 of these masked plugging honeycomb structures 200 were peeled by the automatic mask peeling apparatus 10 shown in FIG. 1.

The automatic mask peeling apparatus 10 of FIG. 1 includes: the bar conveyor (carrying apparatus) 55 for carrying the masked plugging honeycomb structure 200, a pair of the end face brushes 31, a pair of the first side face brushes 32, the first honeycomb rotation apparatus 60, a pair of the second side face brushes 33, the second honeycomb rotation apparatus 61, the air injection apparatus 36, and the mask peeling apparatus 50 that are arranged in an order from the upstream of this bar conveyor 55. The bar conveyor 55 was set so that the carrying speed of the masked plugging honeycomb structure 200 was 60 mm/second.

Each of the pair of the end face brushes 31, the pair of the first side face brushes 32, and the pair of the second side face brushes 33 has the entire circular column-like shape that is obtained by placing a plurality of brush lines on face of a circular disc-like base plate and that is sized to have a diameter of 80 mm and a length of 30 mm. The brush lines are made of nylon and the brush line has a diameter of 0.4 mm. The brush line has a hair length of 20 mm. These brushes are caused to rotate around the axes with a rotation frequency of 400 rpm and are abutted to the mask 24, thereby removing solidified plugging slurry attached to the end face of the masked plugging honeycomb structure 200.

As shown in FIG. 1, the first honeycomb rotation apparatus 60 and the second honeycomb rotation apparatus 61 include: a pair of contact plates 63 having a contact with both end faces of the masked plugging honeycomb structure 200; a pair of arms 64 connected to the contact plates 63; an arm driving apparatus 65 connected with the arms 64 and makes the arms 64 to open or close and to elevate; and a rotation driving apparatus (not shown) that makes the contact plate 63 to be rotated in the plane.

The air injection apparatus 36 includes the four nozzles 34 as shown in FIG. 5. The air injection by the air injection apparatus 36 was performed with an air injection pressure of 0.4 MPa, an air injection time of 0.6 second, and the number of injection of one. The angle formed by the side face 22 of the masked plugging honeycomb structure 200 and a direction along which air is injected was 30 degrees and an air injection speed was 8 m/second.

The mask peeling apparatus 50 includes, as shown in FIG. 6, the holding apparatus 40 that includes the pair of holding nails 41 for holding the folded surplus part of the mask protruding from the end face and the nail driving apparatus for opening and closing the holding nails 41, the first straight driving apparatus 43 for moving the holding apparatus 40, the second straight driving apparatus 45 for moving the first straight driving apparatus 43, and the third straight driving apparatus 47 for moving the second straight driving apparatus 45.

The holding force of the pair of the holding nails 41 was set to 0.3 MPa. A mask adherent layer is prevented from being adhered to a mask holding face of the pair of the holding nails 41 by coating the mask holding face with a ceramic coating for example.

As shown in FIG. 6, the first straight driving apparatus 43 includes: the connecting section 43a connected to the holding apparatus 40; the first shaft 43b for moving the connecting section 43a in the straight direction; the first cylinder 43c to which or from which the first shaft 43b can be inserted or pulled out; and the first cylindrical extension coil spring 43d (spring constant: 0.75 N/mm) that is provided between the connecting section 43a and the first cylinder 43c and that generates a force in a direction opposite to the direction along which the connecting section 43a moves to the first cylinder 43c. The travel distance for which the connecting section 43a moves by the first shaft 43b was set to 5 mm and the travel time required for the connecting section 43a to travel the distance was set to 1.0 second.

As shown in FIG. 6, the second straight driving apparatus 45 may include: the support body 45a that is connected to the first cylinder 43c of the first straight driving apparatus 43 and that supports the first straight driving apparatus 43; the second shaft 45b that causes the support body 45a to move in the horizontal direction; the second cylinder 45c to which or from which the second shaft 45b can be inserted or pulled out; and the second cylindrical extension coil spring 45d (spring constant: 0.25 N/mm) that is provide between the support body 45a and the second cylinder 45c and that generates a force in a direction opposite to the direction along which the support body 45a moves to the second cylinder 45c in the horizontal direction. The support body 45a has the first cylinder supporting face 45a1 inclined to the horizontal direction with 15 degrees. The travel distance for which the support body 45a moves by the second shaft 45b was set to 45 mm and the travel time required for the support body 45a to travel the distance was set to 3.0 second.

As shown in FIG. 6, the third straight driving apparatus 47 includes: the support plate 47a that is connected to the second cylinder 45c of the second straight driving apparatus 45 to support the second straight driving apparatus 45; the third shaft 47b that causes the support plate 47a to move in the vertical direction; and the third cylinder 47c to which or from which the third shaft 47b can be inserted or pulled out. The travel distance for which the support plate 47a moves by the third shaft 47b was set to 90 mm and the travel time required for the support plate 47a to move the distance was set to 3.5 second.

By using the automatic mask peeling apparatus 10 of FIG. 1, it was confirmed that all of the masks 24 adhered to the masked plugging honeycomb structure 200 could be peeled in a favorable manner without causing a part of the masks 24 to be left on the end face.

INDUSTRIAL APPLICABILITY

The automatic mask peeling apparatus of the present invention can be favorably used as an apparatus that can automatically peel a mask adhered to an end face of a plugging honeycomb structure when the plugging honeycomb structure is manufactured that is used as a filter for collecting a large amount of particulate included in exhaust gas exhausted from an internal-combustion engine such as a diesel engine.

What is claimed is:

1. An automatic mask peeling apparatus for peeling a mask of a masked plugging honeycomb structure; the masked plugging honeycomb structure being obtainable by adhering, on at least one end face of a quadrangular prism-like honeycomb structure having a plural number of porous partition walls for dividing a plurality of cells, a mask having a larger area than that of the one end face, opening a plural number of holes at a predetermined position of the mask to form plugging sections by immersing the masked structure in plugging slurry at one end face to which the holed mask has been adhered, thereby the plugging slurry penetrates into the holes to form the plugging sections, and dry plugging slurry inclusive of one attached on the mask to solidify plugging slurry, which comprises:

a brushing apparatus for removing the solidified plugging slurry having been attached to the mask of the masked plugging honeycomb structure;

an air injection apparatus for injecting, after removing the solidified plugging slurry having been attached to the mask of the masked plugging honeycomb structure, air from the opposite end face-side of the one end face to a folded surplus part of the mask at the one end face to raise the folded surplus part of the mask;

a mask peeling apparatus for holding the folded surplus part raised by the air injection apparatus to peel the mask from the masked plugging honeycomb structure; and a carrying apparatus for carrying the masked plugging honeycomb structure from the brushing apparatus to the mask peeling apparatus.

2. The automatic mask peeling apparatus according to claim 1, wherein the brushing apparatus includes:

an end face brush for removing the solidified plugging slurry having been attached to the end face-side of the masked plugging honeycomb structure;

a first side face brush for removing the solidified plugging slurry having been attached to a pair of opposing side faces of the masked plugging honeycomb structure; and a second side face brush for removing the solidified plugging slurry having been attached to another pair of opposing side faces of the masked plugging honeycomb structure.

3. The automatic mask peeling apparatus according to claim 2, wherein the automatic mask peeling apparatus includes a honeycomb rotation apparatus that is positioned between the first side face brush and the second side face brush and that causes the masked plugging honeycomb structure to be rotated 90 degrees around the axis of the masked plugging honeycomb structure.

\* \* \* \* \*